W. M. KELSEY.
METHOD OF REGENERATING CONTACT MASS.
APPLICATION FILED AUG. 9, 1911.
1,047,236.
Patented Dec. 17, 1912.
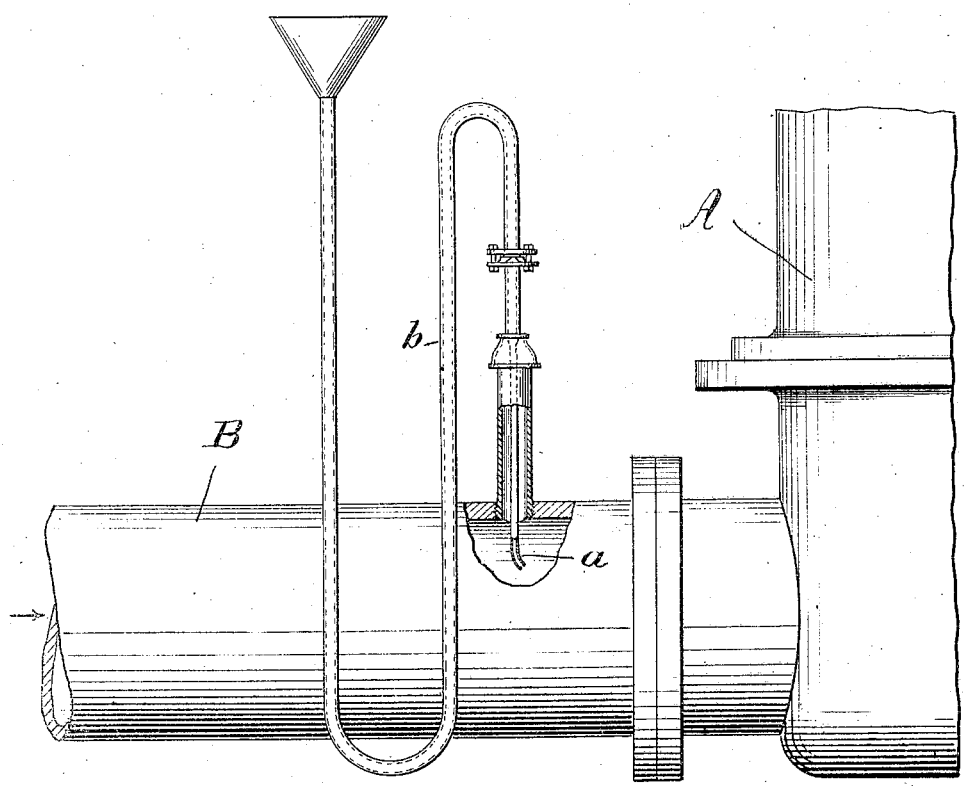
WITNESSES:
INVENTOR
BY
ATTORNEYS

UNITED STATES PATENT OFFICE.

WESTON M. KELSEY, OF DEPUE, ILLINOIS, ASSIGNOR TO NEW JERSEY ZINC COMPANY, OF NEW YORK, N. Y., A CORPORATION OF NEW JERSEY.

METHOD OF REGENERATING CONTACT MASS.

1,047,236.  Specification of Letters Patent.  Patented Dec. 17, 1912.

Application filed August 9, 1911. Serial No. 643,172.

*To all whom it may concern:*

Be it known that I, WESTON M. KELSEY, a citizen of the United States, residing at Depue, Bureau county, Illinois, have invented certain new and useful Improvements in Methods of Regenerating Contact Mass; and I do hereby declare the following to be a full, clear, and exact description of the invention, such as will enable others skilled in the art to which it appertains to make and use the same.

In catalytic or contact processes for the manufacture of sulfuric anhydrid, the platanized contact mass, as is well known, loses in time its original efficiency in large measure and requires to be regenerated.

My present invention relates to a method of effecting this regeneration.

In carrying out my invention, I pass through the contact mass to be regenerated, a volatilized mixture of nitric acid and hydrochloric acid, at such temperature that there will be no condensation while the volatilized mixture is passing through the mass. The mixture of nitric and hydrochloric acid is conveyed through the mass either by a current of air or a current of burner gas (*i. e.*, the mixture of $SO_2$ and air employed in the production of sulfuric anhydrid). The heat of the air or of the burner gas, as the case may be, is utilized to advantage to volatilize the mixture of nitric acid and hydrochloric acid employed. A temperature of 200° C. is feasible for the purpose, but for the attainment of the best results, I find it desirable to preheat either the air current or the burner gas current to from 450° C. to 500° C., and, in some instances, even a higher temperature of preheating may be employed.

In the accompanying drawing, I have illustrated a fragmentary view of a familiar form of a converter employed for containing the contact mass employed in the manufacture of sulfuric anhydrid from a mixture containing burner gases.

In the drawing, A indicates the converter, and B the inlet pipe or conduit at the base thereof for supplying it with the burner gas mixture or with air. Within this conduit B, I arrange an open-ended pipe or tube $a$, of lead, forming a termination for the lead pipe $b$ having a double bend, as shown, and a feeding funnel $c$, the arrangement constituting the usual siphon-trap. In practice, when using for the inlet pipe $b$ of the siphon-trap a pipe of $\frac{1}{2}$ inch gage, I have used a $\frac{1}{4}$ inch pipe for the tube $a$ and have made the exit opening from said tube $a$, $\frac{1}{8}$ of an inch in diameter.

The mixture made up, say, of 20 quarts of water, 2 quarts of $HNO_3$ comm., and 4 quarts of HCl comm., is caused to fill the trap, whereupon the blower for furnishing the preheated air or burner gas to the 12 inch pipe B is started. The preheating temperature of the air or burner gas being preferably maintained at from 425° to 550° C., the whole quantity of the mixture is added as fast as the small hole in the outlet of the tube $a$ will permit it to flow out.

As will be noted, the tube $a$ is removable and it is only intended to be inserted at the time that the regeneration of the mass is being performed. During that time, the mixture of acid and water being added as rapidly as possible keeps the tube relatively cool.

When preheated air is employed for blowing the volatilized mixture of nitric acid and hydrochloric acid through the contact mass, the blowing of the air through the mass is continued for a period of about 30 minutes after the flow of acid from the tube $a$ has ceased; and, of course, it will be understood that in any event, it will be desirable to cut out the absorbing system from the plant during the regenerating operation so that the regenerating agents shall not enter that system. After the regeneration of the mass has been accomplished, the usual connections may be replaced, and the plant thus restored to its original condition.

Having thus described my invention what I claim is:

1. The method of regenerating contact mass, which consists in blowing through the mass, a volatilized mixture of nitric acid and hydrochloric acid; substantially as described.

2. The method of regenerating contact mass, which consists in blowing through the mass, a volatilized mixture of nitric acid and hydrochloric acid, by means of a preheated aeriform fluid; substantially as described.

3. The method of regenerating contact mass, which consists in blowing through the mass, a volatilized mixture of nitric acid and hydrochloric acid, by means of a preheated aeriform fluid, at such temperature that there will be no condensation thereof in the contact mass; substantially as described.

4. The method of regenerating contact mass, which consists in blowing through the mass a volatilized mixture of nitric acid and hydrochloric acid, by means of an aeriform fluid preheated to a temperature above 400° C.; substantially as described.

In testimony whereof I affix my signature, in presence of two witnesses.

WESTON M. KELSEY.

Witnesses:
   A. D. TERRELL,
   W. I. CHASE.